US012159516B1

(12) United States Patent
Mazumder et al.

(10) Patent No.: US 12,159,516 B1
(45) Date of Patent: Dec. 3, 2024

(54) DETECTING A HARDWARE FAILURE USING OPTICAL ABSORPTION SPECTROSCOPY

(71) Applicant: Bank of America Corporation, Charlotte, NC (US)

(72) Inventors: Shahadat Hossain Mazumder, Charlotte, NC (US); Maneesh Kumar Sethia, Hyderabad (IN); Abhijit Behera, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/461,146

(22) Filed: Sep. 5, 2023

(51) Int. Cl.
*G07F 19/00* (2006.01)
*G01J 3/42* (2006.01)

(52) U.S. Cl.
CPC .............. *G07F 19/209* (2013.01); *G01J 3/42* (2013.01); *G01J 2003/425* (2013.01)

(58) Field of Classification Search
CPC ...... G07F 19/209; G01J 3/42; G01J 2003/425
See application file for complete search history.

(56) References Cited

U.S. PATENT DOCUMENTS

| | | | |
|---|---|---|---|
| 5,252,060 A | 10/1993 | McKinnon et al. | |
| 5,317,156 A | 5/1994 | Cooper et al. | |
| 5,539,207 A * | 7/1996 | Wong | G01N 21/35 |
| | | | 250/339.08 |
| 6,049,388 A * | 4/2000 | Masterson | G01N 21/07 |
| | | | 356/426 |
| 6,064,897 A | 5/2000 | Lindberg et al. | |
| 6,943,353 B2 | 9/2005 | Elmore et al. | |
| 7,372,573 B2 | 5/2008 | Spartz et al. | |
| 7,704,301 B2 | 4/2010 | Zhou et al. | |
| 8,063,373 B2 | 11/2011 | Miller | |
| 8,424,292 B2 | 4/2013 | Hoyte et al. | |
| 8,730,047 B2 | 5/2014 | Ridder et al. | |
| 9,001,335 B2 | 4/2015 | Phillips et al. | |
| 9,606,093 B2 | 3/2017 | Alquaity | |
| 9,696,204 B2 | 7/2017 | Liu et al. | |
| 9,784,674 B2 | 10/2017 | Miron | |
| 10,345,235 B2 | 7/2019 | Harb et al. | |

(Continued)

OTHER PUBLICATIONS

J.M. Gabriagues et al.; "Performance Evaluation of a New Photonic ATM Switching Architecture based on WDM;" Nov. 1992.

*Primary Examiner* — Tuyen K Vo

(57) ABSTRACT

A computing chip may comprise a memory that stores a machine-learning model. an optical absorption spectroscopy component, and one or more processors operably coupled to the memory and the optical absorption spectroscopy component. The one or more processors may cause the optical absorption spectroscopy component to emit radiation to N pre-determined directions within an internal space of a computing device. The one or more processors may cause the optical absorption spectroscopy component to sample an absorption of reflections of the emitted radiation for each of the N pre-determined directions. The one or more processors may determine that one or more hardware components of the computing device are in particular abnormal conditions by processing the N sampled absorptions with the machine-learning model. The one or more processors may send a notification indicating that the one or more hardware components are in the particular abnormal conditions.

20 Claims, 3 Drawing Sheets

(56) References Cited

U.S. PATENT DOCUMENTS

| | | |
|---|---|---|
| 10,643,008 B2 | 5/2020 | Liu et al. |
| 10,809,164 B2 | 10/2020 | Young et al. |
| 2004/0088113 A1* | 5/2004 | Spoonhower ......... G01M 3/005 702/185 |
| 2006/0066824 A1* | 3/2006 | Knappe ............... G03F 7/70925 355/30 |
| 2009/0086206 A1* | 4/2009 | Mori ..................... G01N 21/39 438/46 |
| 2016/0282260 A1* | 9/2016 | Meyers ............. G01N 33/0009 |
| 2017/0265787 A1* | 9/2017 | Wong ..................... A61B 5/681 |
| 2021/0148813 A1* | 5/2021 | Ingham ................ G01N 21/552 |

* cited by examiner

DETECTING A HARDWARE FAILURE USING OPTICAL ABSORPTION SPECTROSCOPY

TECHNICAL FELD

The present disclosure relates generally to monitoring computing devices, and more specifically to detecting a hardware failure using optical absorption spectroscopy.

BACKGROUND

Autonomously functioning computing devices are deployed at various locations to provide services to users. Examples of the autonomously functioning computing devices may include, but not limited to, interactive kiosks, automated vending machines, and automated teller machines (ATMs). Because such a computing device is functioning autonomously without human monitoring, detecting one or more hardware failures within the computing device in real-time may be challenging.

SUMMARY

The system and methods implemented by a computing chip as disclosed in the present disclosure provide technical solutions to the technical problems discussed above by detecting one or more hardware components of a computing device being in certain abnormal conditions using optical absorption spectroscopy techniques. The computing chip as disclosed in the present disclosure may also be referred to as a smart chip. The disclosed system and methods provide several practical applications and technical advantages.

For example, the disclosed system and methods provide the practical application of detecting that a subset of hardware components within a computing device are in abnormal conditions and expediting a process of resolving the abnormal conditions of the subset of hardware components by notifying the detection and by providing instructions to resolve the abnormal conditions of the subset of hardware components. Autonomously functioning computing devices are deployed at various locations to provide services to users. Examples of the autonomously functioning computing devices may include, but not limited to, interactive kiosks, automated vending machines, and automated teller machines (ATMs). Because such a computing device is functioning autonomously without human monitoring, one or more hardware failures within the computing device may not be detected until a following check-up, which may result in a long service outage of the computing device. Even after the check-up reveals that at least a part of the computing device is not functioning properly, considerable amount of time may be needed for a technician to diagnose the computing device to determine exact components in abnormal conditions and to determine how to resolve the problem. A smart chip disclosed herein may be located within a computing device. The smart chip may keep monitoring hardware components of the computing device using optical absorption spectroscopy techniques. Once the smart chip detects that one or more hardware components are in certain abnormal conditions, the smart chip may send a notification to a server so that a technician may be dispatched immediately to resolve the issue. The smart chip may also provide instructions to resolve the certain abnormal conditions of the one or more hardware components to help the technician to resolve the issue as quickly as possible.

In particular embodiments, a smart chip may be a system on a chip (SoC) comprising a memory that stores a machine-learning model, an optical absorption spectroscopy component, and one or more processors operably coupled to the memory and the optical absorption spectroscopy component. The one or more processors of the smart chip may be configured to cause the optical absorption spectroscopy component to emit radiation to N pre-determined directions within an internal space of a computing device. The one or more processors may be configured to cause the optical absorption spectroscopy component to sample an absorption of reflections of the emitted radiation for each of the N pre-determined directions.

The one or more processors may determine that one or more hardware components of the computing device are in particular abnormal conditions by processing the N sampled absorptions with the machine-learning model. The machine-learning model may be trained to compute probabilities of subsets of hardware components of the computing device being in abnormal conditions based on the N sampled absorptions. The machine-learning model may be a classification machine-learning model of M classes. Each of the M classes may represent that a subset of the hardware components of the computing device are in abnormal conditions. In particular embodiments, the machine-learning model may be a deep neural network (DNN)-based machine-learning model. In particular embodiments, the machine-learning model may be a convolutional neural network (CNN)-based machine-learning model. The one or more processors may determine that the one or more hardware components are in the particular abnormal conditions based on a fact that a computed probability for a particular class representing the one or more hardware components being in the particular abnormal conditions is highest among computed probabilities for the M classes as a result of processing the N sampled absorptions with the machine-learning model. Each of the M classes may be associated with a set of pre-determined instructions to resolve the abnormal conditions of a corresponding subset of the hardware components. Each set of pre-determined instructions may further comprise instructions to access a corresponding subset of the hardware components.

The one or more processors may send a notification indicating that the one or more hardware components are in the particular abnormal conditions in response to the determination. In particular embodiments, the one or more processors may be further configured to send the pre-determined instructions associated with the particular class to an electronic device associated with a technician assigned to resolve the particular abnormal conditions of the one or more hardware components to provide the technician with instructions to access the one or more hardware components and to resolve the particular abnormal conditions. The one or more processors may be further configured to receive a report comprising a list of hardware components that were actually in abnormal conditions from the electronic device associated with the technician and update the machine-learning model using a pair of the N sampled absorptions and the list of hardware components as additional training data.

In particular embodiments, the computing device may comprise a first hardware component and a second hardware component. The one or more processors may be configured to determine that the first hardware component is in a first abnormal condition based at least in part upon first N sampled absorptions processed by the machine-learning model and send a set of first pre-determined instructions to resolve the first abnormal condition of the first hardware component to a first electronic device associated with a first technician assigned to resolve the first abnormal condition of the first hardware component. The one or more processors may be further configured to determine that the second hardware component is in a second abnormal condition based at least in part upon second N sampled absorptions processed by the machine-learning model and send a set of second pre-determined instructions to resolve the second abnormal condition of the second hardware component to a second electronic device associated with a second technician assigned to resolve the second abnormal condition of the second hardware component. In particular embodiments, the computing device may be an ATM. The first hardware component may be a printer. The second hardware component may be a display screen.

Thus, the disclosed system and method generally improve the technology related to monitoring hardware components of a computing device. The disclosed system and method distributes loads into multiple processors in a distributed manner so that a potential processing bottleneck may be avoided in responding to the metaverse users. Furthermore, the disclosed system and method provide interaction resiliency by employing queuing and retrying at the remote node processor, which may eliminate retransmissions of the task request from the metaverse user and complete the task with reduced delay.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, no sound technical solution exists for detecting one or more hardware failures of an autonomously functioning computing device in real time. This disclosure presents a system and methods for detecting hardware failures of an autonomously functioning computing device in real time using optical absorption spectroscopy by referring to FIGS. 1 through 3.

Example Smart Chip

Figure 1:
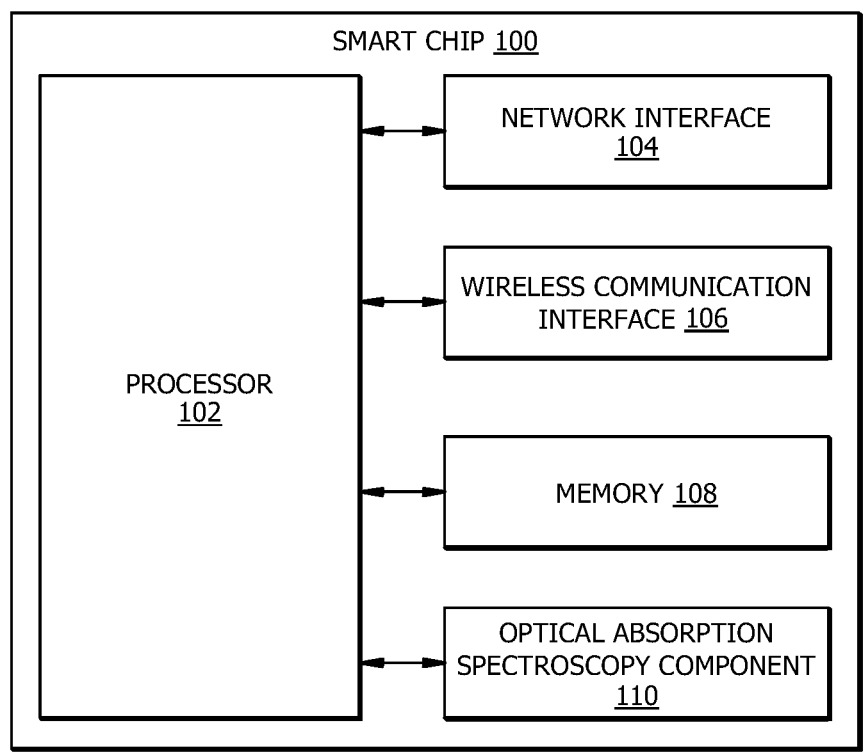
FIG. 1 is a schematic diagram of a smart chip, in accordance with certain aspects of the present disclosure.

FIG. 1 is a schematic diagram of a smart chip, in accordance with certain aspects of the present disclosure. The smart chip 100 may be an SoC comprising a processor 102, network interface 104, a wireless communication interface 106, a memory 108, and an optical absorption spectroscopy component 110.

The processor 102 comprises one or more processors operably coupled to and in signal communication with the memory 108, the network interface 104, the wireless communication interface 106, and the optical absorption spectroscopy component 110. Processor 102 is configured to receive and transmit electrical signals among one or more of the network interface 104, the wireless communication interface 106, the memory 108 and the optical absorption spectroscopy component 110. The electrical signals are used to send and receive data and/or to control or communicate with other devices. Processor 102 may be operably coupled to one or more other devices.

The processor 102 is any electronic circuitry including, but not limited to, state machines, one or more central processing unit (CPU) components, logic units, cores (e.g., a multi-core processor), field-programmable gate array (FPGAs), application specific integrated circuits (ASICs), or digital signal processors (DSPs). The processor 102 may be a programmable logic device, a microcontroller, a microprocessor, or any suitable combination of the preceding. The one or more processors are configured to process data and may be implemented in hardware or software. For example, the processor 102 may be 8-bit, 16-bit, 32-bit, 64-bit or of any other suitable architecture. The processor 102 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 2 and 3. For example, the processor 102 may be configured to cause the optical absorption spectroscopy component 110 to emit radiation to N pre-determined directions within an internal space of a computing device, cause the optical absorption spectroscopy component 110 to sample an absorption of reflections of the emitted radiation for each of the N pre-determined directions, determine that one or more hardware components of the computing device are in particular abnormal conditions by processing the N sampled absorptions with a machine-learning model, and send a notification indicating that the one or more hardware components are in the particular abnormal conditions in response to the determination. In some embodiments, the function described herein is implemented using logic units, FPGAs, ASICs, DSPs, or any other suitable hardware or electronic circuitry.

The network interface 104 is configured to enable wired and/or wireless communications with external devices or systems via a network infrastructure. The network interface 104 is configured to communicate data between the smart chip 100 and other network devices, systems, or domain(s). For example, the one or more network interface 104 may comprise a WIFI interface, a local area network (LAN) interface, a wide area network (WAN) interface, a modem, a switch, or a router. The processor 102 is configured to send and receive data using the network interface 104. The network interface 104 may be configured to use any suitable type of communication protocol as would be appreciated by one of ordinary skill in the art.

Examples of wireless communication interface 106 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 106 is configured to facilitate processor 102 in communicating with other devices. For example, wireless communication interface 106 is configured to enable processor 102 to send and receive signals with other devices, such as an electronic device associated with a technician. Wireless communication interface 106 is configured to employ any suitable communication protocol.

Figure 2:
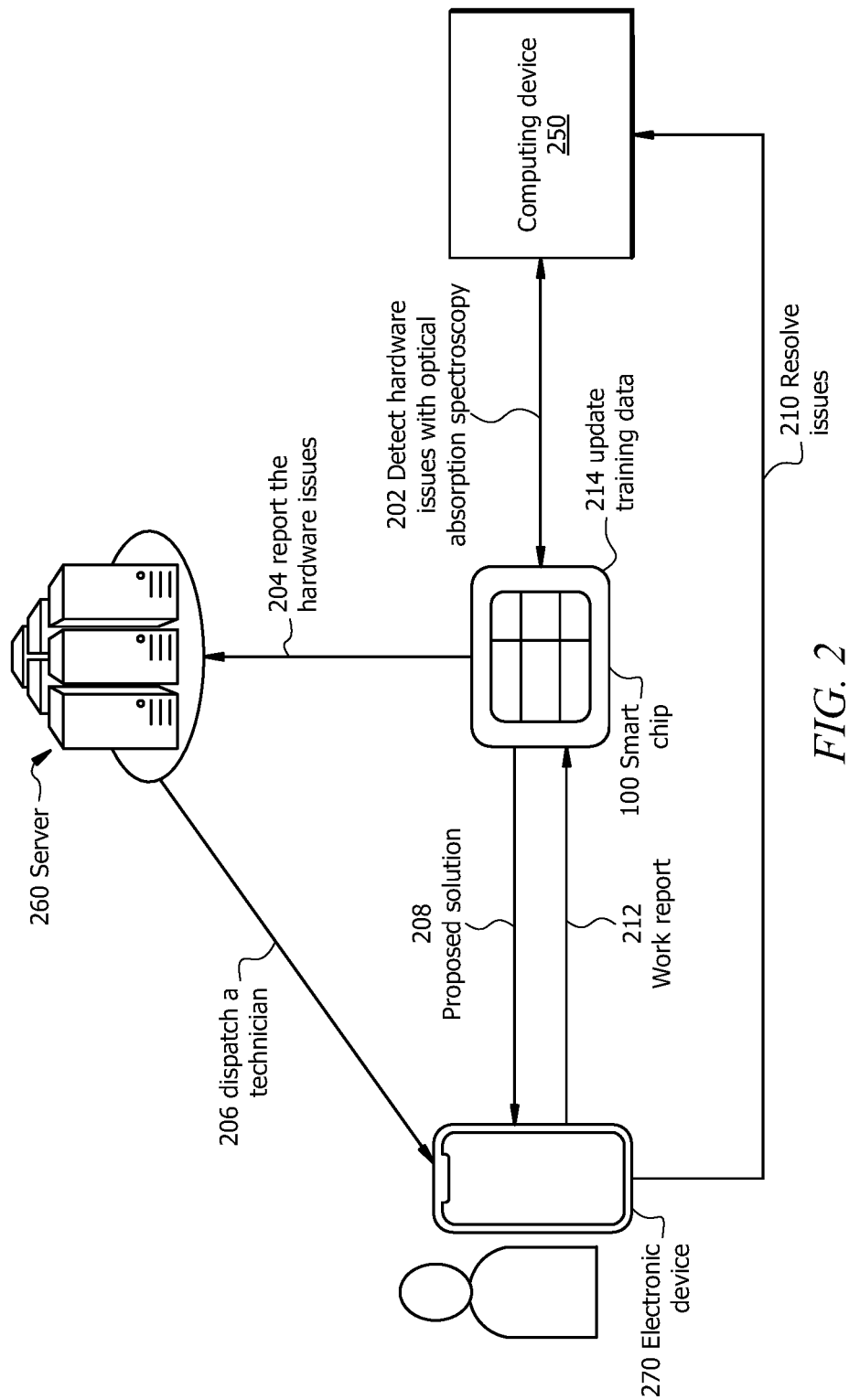
FIG. 2 is a block diagram of an embodiment of a hardware component monitoring system in which the smart chip of FIG. 1 is used.
Figure 3:
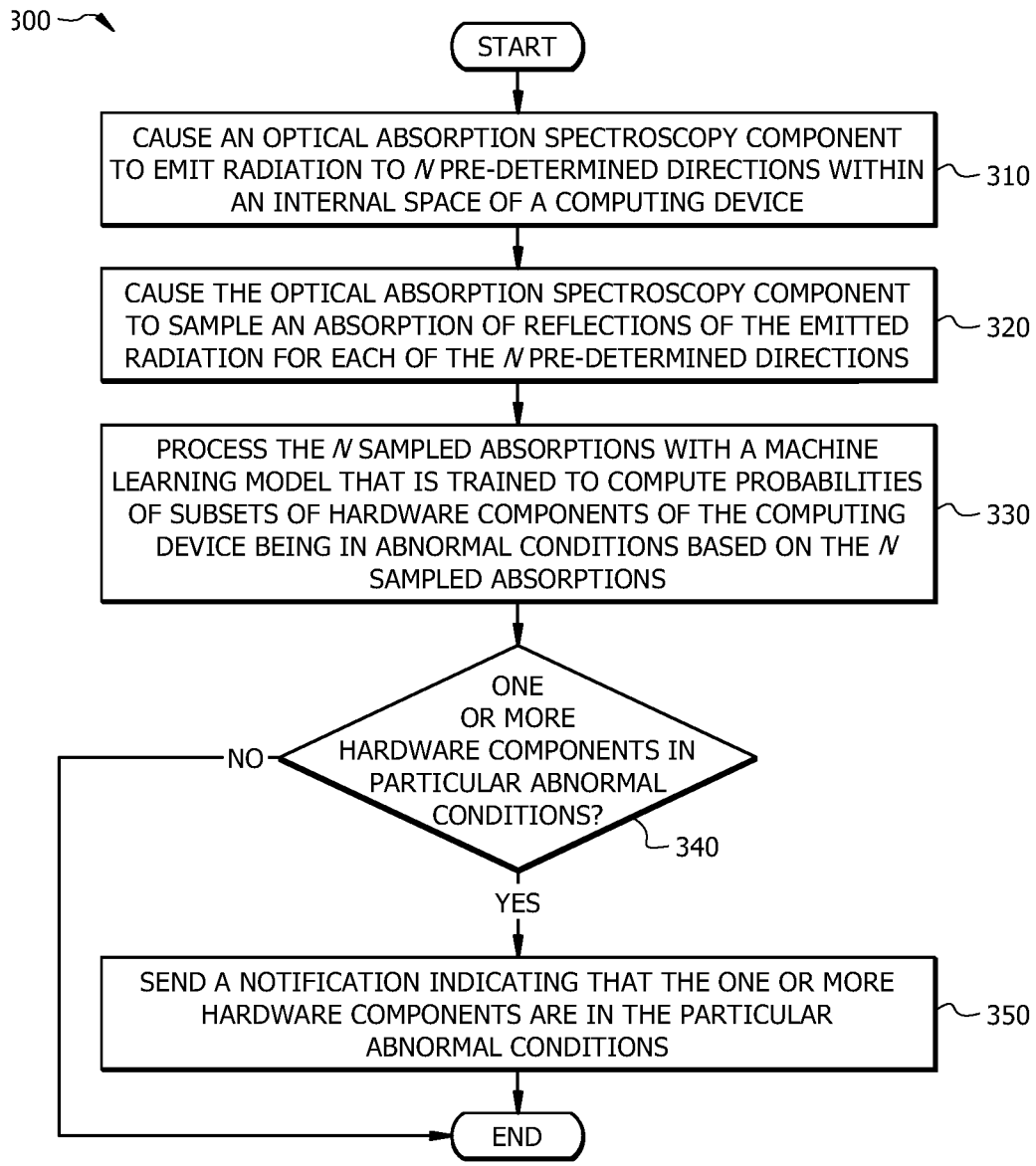
FIG. 3 illustrates a flowchart of an example method for monitoring hardware components of a computing device, in accordance with one or more embodiments of the present disclosure.

The memory 108 is operable to store any of the information described with respect to FIGS. 2 and 3 along with any other data, instructions, logic, rules, or code operable to implement the function(s) described herein when executed by processor 102. For example, the memory 108 may store instructions that are executed by the processor 102. The memory 108 may comprise one or more disks, tape drives, or solid-state drives, and may be used as an over-flow data storage device, to store programs when such programs are selected for execution, and to store instructions and data that are read during program execution. The memory 108 may be operable to store, for example, instructions for performing the functions of the smart chip 100 described herein, and any other data or instructions. The memory 108 may store a machine-learning model that is pre-trained to compute probabilities of subsets of hardware components of the computing device being in abnormal conditions based on sampled absorptions of reflections of the emitted radiation. The memory 108 may be volatile or non-volatile and may comprise read-only memory (ROM), random-access memory (RAM), ternary content-addressable memory (TCAM), dynamic random-access memory (DRAM), and static random-access memory (SRAM).

The optical absorption spectroscopy component 110 may comprise a radiation emitter, a receiver, and a charge-coupled device (CCD). The radiation emitter of the optical absorption spectroscopy component 110 may be capable of emitting radiation to a determined direction. The receiver of the optical absorption spectroscopy component 110 may capture reflections of the emitted radiation. The receiver may also split the captured light into narrow wavelength bands. Finally, the light may be captured by the CCD of the optical absorption spectroscopy component 110 and may be sampled into an electrical signal for processing. The optical absorption spectroscopy component 110 may measure an absorption of electromagnetic radiation, as a function of frequency or wavelength, based on samples of the absorption of electromagnetic radiation. The sample absorbs energy, i.e., photons, from the radiating field. Absorption spectroscopy is performed across the electromagnetic spectrum. Optical absorption spectroscopy may be used in chemical analysis because of its specificity and its quantitative nature. The specificity of absorption spectra allows compounds to be distinguished from one another in a mixture, making absorption spectroscopy useful in wide variety of applications. For instance, Infrared gas analyzers can be used to identify the presence of pollutants in the air, distinguishing the pollutant from nitrogen, oxygen, water, and other expected constituents. The processor 102 may be configured to transmit electrical signals to the optical absorption spectroscopy component 110 to control the optical absorption spectroscopy component 110. The processor 102 may also be configured to receive electrical signals from the optical absorption spectroscopy component 110 for samples/measurements of an absorption of reflections of the emitted radiation. The optical absorption spectroscopy component 110 may be integrated into the smart chip 100.

Detecting Abnormal Conditions of One or More Hardware Components of a Computing Device FIG. 2 is a block diagram of an embodiment of a hardware component monitoring system in which the smart chip of FIG. 1 is used. In particular embodiments, the smart chip 100 may be located within a computing device 250. The smart chip 100 may monitor hardware components of the computing device 250 using optical absorption spectroscopy techniques. Once the smart chip 100 detects that one or more hardware components are in certain abnormal conditions, the smart chip 100 may send a notification to a server 260 so that a technician may be dispatched immediately to resolve the issue. The smart chip 100 may also provide instructions to resolve the certain abnormal conditions of the one or more hardware components to an electronic device 270 associated with the technician to help the technician to resolve the issue as quickly as possible.

In particular embodiments, the smart chip 100 may be a system on a chip (SoC) comprising a memory 108 that stores a machine-learning model, an optical absorption spectroscopy component 110, and one or more processors 102 operably coupled to the memory 108 and the optical absorption spectroscopy component 110. In particular embodiments, the smart chip 100 may also comprise network interface 104 and wireless communication interface 106. The one or more processors 102 of the smart chip 100 may be configured to detect hardware issues using optical absorption spectroscopy at operation 202. To detecting hardware issues, the one or more processors 102 may cause the optical absorption spectroscopy component 110 to emit radiation to N pre-determined directions within an internal space of the computing device 250. The N directions may be carefully determined to monitor all the hardware components of the computing device 250. The one or more processors 102 may be configured to cause the optical absorption spectroscopy component 110 to sample an absorption of reflections of the emitted radiation for each of the N pre-determined directions. The sampled reflections of the emitted radiation may vary because of various factors including, but not limited to, changes in light, temperature, voltage, or an electric current associated with one or more of the one or more hardware components. As an example and not by way of limitation, when a printer of an ATM has a paper jam, the light of the printer indicating a printer jam may be blinking. Then, the sampled reflections of the emitted ration may be different from those when the printer does not experience a paper jam. As another example and not by way of limitation, when a temperature of a display of the ATM goes up due to any suitable reason, the sampled reflections of the emitted ration may be different from those when the temperature of the display is within a normal range.

In particular embodiments, the one or more processors 102 may determine that one or more hardware components of the computing device 250 are in particular abnormal conditions by processing the N sampled absorptions with the machine-learning model. The machine-learning model may be trained to compute probabilities of subsets of hardware components of the computing device being in abnormal conditions based on the N sampled absorptions. The machine-learning model may be a classification machine-learning model of M classes, in which the machine-learning model produces a probability associated with each of the M classes. Each of the M classes may represent that a subset of the hardware components of the computing device are in abnormal conditions. As an example and not by way of limitation, each class of the machine-learning model may represent that a particular hardware component of the computing device 250 is in an abnormal condition. A number of classes M, in such an example, may be one larger than a number of monitored hardware components of the computing device 250, where a particular class may represent that no hardware components of the computing device 250 is in an abnormal condition. As another example and not by way of limitation, a class of the machine-learning model may represent a subset of the hardware components of the computing device is in a corresponding abnormal condition. For example, a first class may represent that no hardware component is in an abnormal condition. A second class may represent that hardware components i and j have high temperature than normal. A third class may represent that electric currents on hardware components k, l, and m are considerably lower than normal levels.

In particular embodiments, the machine-learning model may be a DNN-based classification machine-learning model. In particular embodiments, the machine-learning model may be a CNN-based classification machine-learning model. In particular embodiments, the machine-learning model may be an ensemble model that determines a probability of each class based on results of a plurality of machine-learning models. Although this disclosure describes particular machine-learning models, this disclosure contemplates any suitable machine-learning model to compute probabilities of subsets of hardware components of the computing device being in abnormal conditions based on the N sampled absorptions.

In particular embodiments, the one or more processors 102 may determine that the one or more hardware components of the computing device 250 are in the particular abnormal conditions based on a fact that a computed probability for a particular class representing the one or more hardware components being in the particular abnormal conditions is highest among computed probabilities for the M classes as a result of processing the N sampled absorptions with the machine-learning model.

In particular embodiments, the one or more processors 102 may repeat operation 202 at a pre-determined interval. In particular embodiments, the one or more processors 102 may determine an interval between radiation emissions in real time based on variable factors including, but not limited to, a current time, an ambient temperature, or a recent abnormal condition detection rate, or any suitable factor.

Providing Instructions to Resolve Detected Abnormal Conditions

In particular embodiments, at operation 204, the one or more processors 102 may send a notification indicating that the one or more hardware components are in the particular abnormal conditions in response to the determination at operation 202. In particular embodiments, the notification may be sent to a server 260 responsible for maintaining the computing device 250. In particular embodiments, the notification may be sent to any suitable entity that is responsible maintaining the computing device 250.

In particular embodiments, the server 260 or any suitable entity responsible maintaining the computing device 250 may dispatch a technician to resolve the detected abnormal conditions of the one or more hardware components. As an example and not by way of limitation, the server 260 may select a technician having an expertise with the detected abnormal conditions and send a notification to an electronic device 270 associated with the selected technician. As another example and not by way of limitation, the server 260 may select a technician within a pre-determined vicinity of the computing device 250 and send a notification to an electronic device 270 associated with the selected technician.

In particular embodiments, each of the M classes of the machine-learning model may be associated with a set of pre-determined instructions to resolve the abnormal conditions of a corresponding subset of the hardware components. Each set of pre-determined instructions may further comprise instructions to access a corresponding subset of the hardware components. In particular embodiments, at operation 208, the one or more processors 102 may be further configured to send the pre-determined instructions associated with the particular class to an electronic device 270 associated with a technician assigned to resolve the particular abnormal conditions of the one or more hardware components to provide the technician with instructions to access the one or more hardware components and to resolve the particular abnormal conditions. As an example and not by way of limitation, the electronic device 270 may contact the smart chip 100 through the wireless communication interface 106 when the technician arrives to the computing device 250. The smart chip 100 may provide the pre-determined instructions associated with the particular class to the electronic device 270 in response. As another example and not by way of limitation, the smart chip 100 may detect the electronic device 270 when the electronic device 270 approaches toward the computing device 250, and consequently toward the smart chip 100. Upon detecting the electronic device 270, the smart chip 100 may provide the pre-determined instructions associated with the particular class to the electronic device 270. Alternatively, the one or more processors 102 may be configured to send the pre-determined instructions associated with the particular class to the server 260 along with the notification at operation 204. Then, the server 260 may forward the instructions to the electronic device 270 associated with the technician.

At operation 210, the technician may work on resolving the abnormal conditions of the one or more hardware components of the computing device 250. The pre-determined instructions may include instructions to access the one or more hardware components of the computing device 250. As an example and not by way of limitation, an ATM may have a number of access points to get into the hardware components. The instructions may identify a best access point among the number of access points to get to the one or more hardware component experiencing the particular abnormal conditions. The technician may open the identified access point to reach the one or more hardware components. The pre-determined instructions may include how to resolve the particular abnormal conditions. The technician may follow the instructions to resolve the particular abnormal conditions and observe whether the particular abnormal conditions are resolved. As another example and not by way of limitation, the instructions may include remove a jammed paper from the printer if the particular abnormal condition include a paper jam on the printer. The technician may try to remove the jammed paper and observe whether the computing device 250 is in a normal condition.

In particular embodiments, at operation 212, the one or more processors 102 may be configured to receive a report through the wireless communication interface 106 comprising a list of hardware components that were actually in abnormal conditions from the electronic device 270 associated with the technician. The one or more processors 102 may update the machine-learning model using a pair of the N sampled absorptions and the list of hardware components as additional training data at operation 214. As an example and not by way of limitation, the one or more processors 102 determined that a printer was experiencing a paper jam by processing N sampled absorptions using the machine-learning model. After working on the issue, the technician may report using the electronic device 270 associated with the technician that the paper jam was actually a cause of an abnormal condition. Then, the one or more processors 102 may not update the machine-learning model as the machine-learning model detected the problem correctly. As another example and not by way of limitation, the technician may conclude that the printer experienced a low ink level, not a paper jam. The technician may report the work result to the smart chip 100 via the wireless communication interface 106. The one or more processors 102 may update the machine-learning model using a pair of the N sample absorptions and a label indicating the low ink level as a part of training data. When the printer experience a low ink level in the future, the machine-learning model may have better chance to detect the problem correctly. As yet another example and not by way of limitation, the one or more processors 102 determined that the printer was experiencing a paper jam by processing the N sampled absorptions with the machine-learning model. After working on the computing device 250 at operation 210, the technician may conclude that no hardware component of the computing device 250 experiences an abnormal condition. The technician reports the results at operation 212. The one or more processors 102 may update the machine-learning model using a pair of the N sampled absorptions and a label indicating no abnormal condition as a part of training data.

In particular embodiments, the computing device 250 may comprise a first hardware component and a second hardware component. The one or more processors 102 may be configured to determine that the first hardware component is in a first abnormal condition based at least in part upon first N sampled absorptions processed by the machine-learning model and send a set of first pre-determined instructions to resolve the first abnormal condition of the first hardware component to a first electronic device 270 associated with a first technician assigned to resolve the first abnormal condition of the first hardware component. The one or more processors 102 may be further configured to determine that the second hardware component is in a second abnormal condition based at least in part upon second N sampled absorptions processed by the machine-learning model and send a set of second pre-determined instructions to resolve the second abnormal condition of the second hardware component to a second electronic device 270 associated with a second technician assigned to resolve the second abnormal condition of the second hardware component. In particular embodiments, the computing device 250 may be an ATM. The first hardware component may be a printer. The second hardware component may be a display screen.

Example Method

FIG. 3 illustrates a flowchart of an example method 300 for monitoring hardware components of a computing device, in accordance with one or more embodiments of the present disclosure. Method 300 may be performed by the smart chip 100 shown in FIG. 1. The smart chip 100 may comprise a processor 102, a network interface 104, a wireless communication interface 106, a memory 108, and an optical absorption spectroscopy component 110.

At operation 310, the smart chip 100 may cause the optical absorption spectroscopy component 110 to emit radiation to N pre-determined directions within an internal space of a computing device 250. The N directions may be carefully determined to monitor all the hardware components of the computing device 250. At operation 320, the smart chip 100 may cause the optical absorption spectroscopy component 110 to sample an absorption of reflections of the emitted radiation. The sampled reflections of the emitted radiation may vary because of various factors including, but not limited to, changes in light, temperature, voltage, or an electric current associated with one or more of the one or more hardware components. At operation 330, the smart chip 100 process the N sampled absorptions with the machine-learning model. The machine-learning model may be trained to compute probabilities of subsets of hardware components of the computing device being in abnormal conditions based on the N sampled absorptions. The machine-learning model may be a classification machine-learning model of M classes, in which the machine-learning model produces a probability associated with each of the M classes. Each of the M classes may represent that a subset of the hardware components of the computing device are in abnormal conditions. At operation 340, the smart chip 100 may determine whether the one or more hardware components of the computing device 250 are in the particular abnormal conditions based on a fact that a computed probability for a particular class representing the one or more hardware components being in the particular abnormal conditions is highest among computed probabilities for the M classes as a result of processing the N sampled absorptions with the machine-learning model. If no hardware component of the computing device 250 is in an abnormal condition, the method proceeds to end. Once the smart chip 100 determines that the one or more hardware components of the computing device 250 are in the particular abnormal conditions, the method may proceed to operation 350 where the smart chip 100 may send a notification indicating that the one or more hardware components are in the particular abnormal conditions in response to the determination at operation 340. In particular embodiments, the notification may be sent to a server 260 responsible for maintaining the computing device 250.

In particular embodiments, the smart chip 100 may repeat method 300 continuously to monitor the hardware components of the computing device 250. In particular embodiments, the smart chip 100 may repeat method 300 at a pre-determined constant interval. In particular embodiments, the smart chip 100 may an interval between radiation emissions in real time based on variable factors including, but not limited to, a current time, an ambient temperature, or a recent abnormal condition detection rate, or any suitable factor.

The invention claimed is:

1. A computing chip, comprising:
a memory that stores a machine-learning model;
an optical absorption spectroscopy component; and
one or more processors operably coupled to the memory and the optical absorption spectroscopy component, the one or more processors configured to:
cause the optical absorption spectroscopy component to emit radiation to N pre-determined directions within an internal space of a computing device;
cause, for each of the N pre-determined directions, the optical absorption spectroscopy component to sample an absorption of reflections of the emitted radiation;
determine that one or more hardware components of the computing device are in particular abnormal conditions by processing the N sampled absorptions with the machine-learning model, wherein the machine-learning model is trained to compute probabilities of subsets of hardware components of the computing device being in abnormal conditions based on the N sampled absorptions; and
send, in response to the determination, a notification indicating that the one or more hardware components are in the particular abnormal conditions.

2. The computing chip of claim 1, wherein the machine-learning model is a classification machine-learning model of M classes, wherein each of the M classes represents that a subset of the hardware components of the computing device are in abnormal conditions, and wherein determining that the one or more hardware components are in the particular abnormal conditions is based on a fact that a computed probability for a particular class representing the one or more hardware components being in the particular abnormal conditions is highest among computed probabilities for the M classes as a result of processing the N sampled absorptions with the machine-learning model.

3. The computing chip of claim 2, wherein each of the M classes is associated with a set of pre-determined instructions to resolve the abnormal conditions of a corresponding subset of the hardware components, and wherein each set of pre-determined instructions comprises instructions to access a corresponding subset of the hardware components.

4. The computing chip of claim 3, wherein the one or more processors are further configured to:
send, to an electronic device associated with a technician assigned to resolve the particular abnormal conditions of the one or more hardware components, the pre-determined instructions associated with the particular class to provide the technician with instructions to access the one or more hardware components and to resolve the particular abnormal conditions.

5. The computing chip of claim 4, wherein the one or more processors are further configured to:
receive, from the electronic device associated with the technician, a report comprising a list of hardware components that were actually in abnormal conditions; and
update the machine-learning model using a pair of the N sampled absorptions and the list of hardware components as additional training data.

6. The computing chip of claim 4, wherein the computing device comprises a first hardware component and a second hardware component, and wherein the one or more processors are further configured to:
determine that the first hardware component is in a first abnormal condition based at least in part upon first N sampled absorptions processed by the machine-learning model;
send, to a first electronic device associated with a first technician assigned to resolve the first abnormal condition of the first hardware component, a set of first pre-determined instructions to resolve the first abnormal condition of the first hardware component;
determine that the second hardware component is in a second abnormal condition based at least in part upon second N sampled absorptions processed by the machine-learning model; and
send, to a second electronic device associated with a second technician assigned to resolve the second abnormal condition of the second hardware component, a set of second pre-determined instructions to resolve the second abnormal condition of the second hardware component.

7. The computing chip of claim 6, wherein:
the computing device is an automated teller machine (ATM);
the first hardware component is a printer; and
the second hardware component is a display screen.

8. A method, comprising, by a computing chip associated with an optical absorption spectroscopy component:
causing the optical absorption spectroscopy component to emit radiation to N pre-determined directions within an internal space of a computing device;
causing, for each of the N pre-determined directions, the optical absorption spectroscopy component to sample an absorption of reflections of the emitted radiation;
determining that one or more hardware components of the computing device are in particular abnormal conditions by processing the N sampled absorptions with a machine-learning model, wherein the machine-learning model is trained to compute probabilities of subsets of hardware components of the computing device being in abnormal conditions based on the N sampled absorptions; and
sending, in response to the determination, a notification indicating that the one or more hardware components are in the particular abnormal conditions.

9. The method of claim 8, wherein the machine-learning model is a classification machine-learning model of M classes, wherein each of the M classes represents that a subset of the hardware components of the computing device are in abnormal conditions, and wherein determining that the one or more hardware components are in the particular abnormal conditions is based on a fact that a computed probability for a particular class representing the one or more hardware components being in the particular abnormal conditions is highest among computed probabilities for the M classes as a result of processing the N sampled absorptions with the machine-learning model.

10. The method of claim 9, wherein each of the M classes is associated with a set of pre-determined instructions to resolve the abnormal conditions of a corresponding subset of the hardware components, and wherein each set of pre-determined instructions comprises instructions to access a corresponding subset of the hardware components.

11. The method of claim 10, further comprising:
sending, to an electronic device associated with a technician assigned to resolve the particular abnormal conditions of the one or more hardware components, the pre-determined instructions associated with the particular class to provide the technician with instructions to access the one or more hardware components and to resolve the particular abnormal conditions.

12. The method of claim 11, further comprising:
receiving, from the electronic device associated with the technician, a report comprising a list of hardware components that were actually in abnormal conditions; and
updating the machine-learning model using a pair of the N sampled absorptions and the list of hardware components as additional training data.

13. The method of claim 11, wherein the computing device comprises a first hardware component and a second hardware component, the method further comprising:
determining that the first hardware component is in a first abnormal condition based at least in part upon first N sampled absorptions processed by the machine-learning model;
sending, to a first electronic device associated with a first technician assigned to resolve the first abnormal condition of the first hardware component, a set of first pre-determined instructions to resolve the first abnormal condition of the first hardware component;
determining that the second hardware component is in a second abnormal condition based at least in part upon second N sampled absorptions processed by the machine-learning model; and sending, to a second electronic device associated with a second technician assigned to resolve the second abnormal condition of the second hardware component, a set of second pre-determined instructions to resolve the second abnormal condition of the second hardware component.

14. The method of claim 13, wherein:
the computing device is an automated teller machine (ATM);
the first hardware component is a printer; and
the second hardware component is a display screen.

15. A non-transitory computer-readable medium storing instructions that when executed by one or more processors of a computing chip associated with an optical absorption spectroscopy component cause the one or more processors to:
cause the optical absorption spectroscopy component to emit radiation to N pre-determined directions within an internal space of a computing device;
cause, for each of the N pre-determined directions, the optical absorption spectroscopy component to sample an absorption of reflections of the emitted radiation;
determine that one or more hardware components of the computing device are in particular abnormal conditions by processing the N sampled absorptions with a machine-learning model, wherein the machine-learning model is trained to compute probabilities of subsets of hardware components of the computing device being in abnormal conditions based on the N sampled absorptions; and
send, in response to the determination, a notification indicating that the one or more hardware components are in the particular abnormal conditions.

16. The non-transitory computer-readable medium of claim 15, wherein the machine-learning model is a classification machine-learning model of M classes, wherein each of the M classes represents that a subset of the hardware components of the computing device are in abnormal conditions, and wherein determining that the one or more hardware components are in the particular abnormal conditions is based on a fact that a computed probability for a particular class representing the one or more hardware components being in the particular abnormal conditions is highest among computed probabilities for the M classes as a result of processing the N sampled absorptions with the machine-learning model.

17. The non-transitory computer-readable medium of claim 16, wherein each of the M classes is associated with a set of pre-determined instructions to resolve the abnormal conditions of a corresponding subset of the hardware components, and wherein each set of pre-determined instructions comprises instructions to access a corresponding subset of the hardware components.

18. The non-transitory computer-readable medium of claim 17, wherein the instructions further cause the one or more processors to:
send, to an electronic device associated with a technician assigned to resolve the particular abnormal conditions of the one or more hardware components, the pre-determined instructions associated with the particular class to provide the technician with instructions to access the one or more hardware components and to resolve the particular abnormal conditions.

19. The non-transitory computer-readable medium of claim 18, wherein the instructions further cause the one or more processors to:
receive, from the electronic device associated with the technician, a report comprising a list of hardware components that were actually in abnormal conditions; and
update the machine-learning model using a pair of the N sampled absorptions and the list of hardware components as additional training data.

20. The non-transitory computer-readable medium of claim 18, wherein the computing device comprises a first hardware component and a second hardware component, and wherein the instructions further cause the one or more processors to:
determine that the first hardware component is in a first abnormal condition based at least in part upon first N sampled absorptions processed by the machine-learning model;
send, to a first electronic device associated with a first technician assigned to resolve the first abnormal condition of the first hardware component, a set of first pre-determined instructions to resolve the first abnormal condition of the first hardware component;
determine that the second hardware component is in a second abnormal condition based at least in part upon second N sampled absorptions processed by the machine-learning model; and
send, to a second electronic device associated with a second technician assigned to resolve the second abnormal condition of the second hardware component, a set of second pre-determined instructions to resolve the second abnormal condition of the second hardware component.

* * * * *